(12) United States Patent
Wadayama et al.

(10) Patent No.: US 10,495,313 B2
(45) Date of Patent: Dec. 3, 2019

(54) FULL NOZZLE FOR GAS TURBINE COMBUSTOR

(71) Applicant: MITSUBISHI HITACHI POWER SYSTEMS, LTD., Yokohama (JP)

(72) Inventors: Yoshihide Wadayama, Yokohama (JP); Satoshi Kumagai, Yokohama (JP); Yasuhiro Wada, Yokohama (JP); Hirokazu Takahashi, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 561 days.

(21) Appl. No.: 15/188,185

(22) Filed: Jun. 21, 2016

(65) Prior Publication Data

US 2016/0377294 A1  Dec. 29, 2016

(30) Foreign Application Priority Data

Jun. 24, 2015 (JP) ................. 2015-126543

(51) Int. Cl.
*F23R 3/34* (2006.01)
*F23R 3/28* (2006.01)
*F02C 7/22* (2006.01)
*F02C 7/228* (2006.01)

(52) U.S. Cl.
CPC .............. *F23R 3/343* (2013.01); *F02C 7/222* (2013.01); *F02C 7/228* (2013.01); *F23R 3/283* (2013.01);
(Continued)

(58) Field of Classification Search
CPC .......... F23R 3/283; F23R 3/286; F23R 3/343; F23R 2900/00005
See application file for complete search history.

(56) References Cited

U.S. PATENT DOCUMENTS

| 2004/0011054 A1* | 1/2004 | Inoue .......... F23R 3/10 60/776 |
| 2004/0123597 A1 | 7/2004 | Kraft et al. |

(Continued)

FOREIGN PATENT DOCUMENTS

| CN | 1032230 A | 4/1989 |
| CN | 103453553 A | 12/2013 |

(Continued)

OTHER PUBLICATIONS

Walter D. Pilkey, Formulas for Stress, Strain, and Structural Matrices, Jan. 9, 2008, John Wiley and Sons, Inc., Second Edition, pp. 259-264 (Year: 2008).*

(Continued)

*Primary Examiner* — Todd E Manahan
*Assistant Examiner* — Todd N Jordan
(74) *Attorney, Agent, or Firm* — Mattingly & Malur, PC

(57) ABSTRACT

A fuel nozzle for gas turbine combustor of the present invention includes a diffusion combustion burner including a diffusion fuel nozzle, a premixing combustion burner including a premixing fuel nozzle, an end flange to which the diffusion combustion burner and the premixing combustion burner are mechanically joined, and a diffusion combustion burner support which fixes the diffusion combustion burner to the end flange and is mounted around the premixing fuel nozzle in a manner to cover a root portion of the premixing fuel nozzle, the root portion being a junction between the premixing fuel nozzle and the end flange. An outside diameter of the premixing fuel nozzle longitudinally varies in a manner to progressively increase toward the junction. A maximum diameter of the root portion of the premixing fuel nozzle is greater than an inside diameter of a hole formed in the diffusion combustion burner support.

9 Claims, 4 Drawing Sheets

(52) U.S. Cl.
CPC .......... *F23R 3/286* (2013.01); *F05D 2220/32* (2013.01); *F23R 2900/00005* (2013.01); *F23R 2900/00012* (2013.01); *F23R 2900/00018* (2013.01)

(56) References Cited

U.S. PATENT DOCUMENTS

| | | |
|---|---|---|
| 2013/0318975 A1 | 12/2013 | Stoia et al. |
| 2015/0082770 A1 | 3/2015 | Igarashi et al. |
| 2015/0089954 A1 | 4/2015 | Widenhorn et al. |

FOREIGN PATENT DOCUMENTS

| | | |
|---|---|---|
| CN | 104456629 A | 3/2015 |
| EP | 2 980 483 A1 | 2/2016 |
| JP | 2004-138376 A | 5/2004 |
| JP | 2009-014297 A | 1/2009 |
| JP | 2013-245936 A | 12/2013 |
| JP | 2015-59729 A | 3/2015 |

OTHER PUBLICATIONS

Extended European Search Report received in corresponding European Application No. 16175986.5 dated Oct. 21, 2016.

Korean Office Action received in corresponding Korean Application No. 10-2016-0078517 dated Nov. 15, 2017.

Chinese Office Action received in corresponding Chinese Application No. 201610474731.9 dated Apr. 19, 2018 with partial translation.

Indian Office Action received in corresponding Indian Application No. 201614021103 dated Apr. 24, 2019.

* cited by examiner

PRIOR ART

PRIOR ART

# FULL NOZZLE FOR GAS TURBINE COMBUSTOR

CLAIM OF PRIORITY

The present application claims priority from Japanese Patent Application JP 2015-126543 filed on Jun. 24, 2015, the content of which is hereby incorporated by reference into this application.

FIELD OF THE INVENTION

The present invention relates to a fuel nozzle for gas turbine combustor. More particularly, the present invention relates to a fuel nozzle suitable for a gas turbine combustor adopting premixed combustion where a fuel and air are premixed before combustion.

BACKGROUND OF THE INVENTION

There has been a demand for further reduction of NOx in gas turbine exhaust gas from the standpoint of environmental protection. The premixed combustion where the fuel and air are premixed before combustion is known as a combustion method for gas turbine combustor. This method enables significant NOx reduction as compared with diffusion combustion where a fuel is directly sprayed and combusted in a combustion chamber.

Therefore, an increasing number of gas turbines have adopted the premixed combustion to meet the recent NOx emission control standard.

JP 2009-14297 discloses a gas turbine combustor which includes a fuel nozzle for forming a coaxial jet stream of fuel and air, and a fuel nozzle header. JP 2009-14297 also discloses a structure to achieve a longer service life by suppressing heat stress generated in the fuel nozzle header. Specifically, the fuel nozzle header includes a mounting hole for mounting the fuel nozzle. In the mounting hole of the fuel nozzle header, a space section for air layer or a hollow-cylindrical shaped heat-insulating layer is formed between an outer periphery of the fuel nozzle and an inner periphery of the mounting hole. A tail end of the fuel nozzle is provided with engagement means for engagement with the mounting hole of the fuel nozzle header or an end face of the fuel nozzle header formed with this mounting hole. The fuel nozzle is fixed to the fuel nozzle header via the engagement means.

The premixed combustion where the fuel and air are premixed before combustion is known as a measure for reduction of NOx emissions from the gas turbine combustor. However, the premixed combustion is more likely to encounter combustion oscillation than the diffusion combustion where the fuel is combusted after directly sprayed into the combustion chamber. The premixed combustion involves fear that combustor components such as the fuel nozzle are subjected to oscillation stress, sustaining damages caused by high-cycle fatigue.

JP 2009-14297 makes no mention of measures against the fear that the combustor components such as the fuel nozzle are subjected to oscillation stress and sustain damages caused by high-cycle fatigue.

In view of the above problems, the present invention is directed to a premixing fuel nozzle for gas turbine combustor which can even adopt the premixed combustion where the fuel and air are premixed before combustion. The invention has an object to provide a fuel nozzle for gas turbine combustor which increases oscillation strength and eliminates fear of damaging any combustor component by being prevented from scattering in a downstream direction in the event of breakage of the fuel nozzle at a welded part between the fuel nozzle and an end flange.

SUMMARY OF THE INVENTION

According to an aspect of the present invention for achieving the above object, a fuel nozzle for gas turbine combustor includes a diffusion combustion burner including a diffusion fuel nozzle for spraying a diffusion combustion fuel into a combustion chamber; a premixing combustion burner including a premixing fuel nozzle for spraying a premixing fuel into a premixer; an end flange to which the diffusion combustion burner and the premixing combustion burner are mechanically joined; and a diffusion combustion burner support which fixes the diffusion combustion burner to the end flange and is mounted around the premixing fuel nozzle in a manner to cover a root portion of the premixing fuel nozzle, the root portion being a junction between the premixing fuel nozzle and the end flange, wherein an outside diameter of the premixing fuel nozzle longitudinally varies in a manner to progressively increase toward the junction, and wherein a maximum diameter of the root portion of the premixing fuel nozzle is greater than an inside diameter of a hole formed in the diffusion combustion burner support.

Even in the combustor adopting the premixed combustion where the fuel and air are premixed before combustion, the premixing fuel nozzle according to the present invention increases the oscillation strength and eliminates the fear of damaging any combustor component by being prevented from scattering in the downstream direction in the event of breakage of the fuel nozzle at a welded part between the fuel nozzle and the end flange.

DETAILED DESCRIPTION OF THE PREFERRED EMBODIMENTS

A fuel nozzle for gas turbine combustor according to the present invention will hereinbelow be described by way of illustrated embodiments thereof.

First Embodiment

Figure 1:
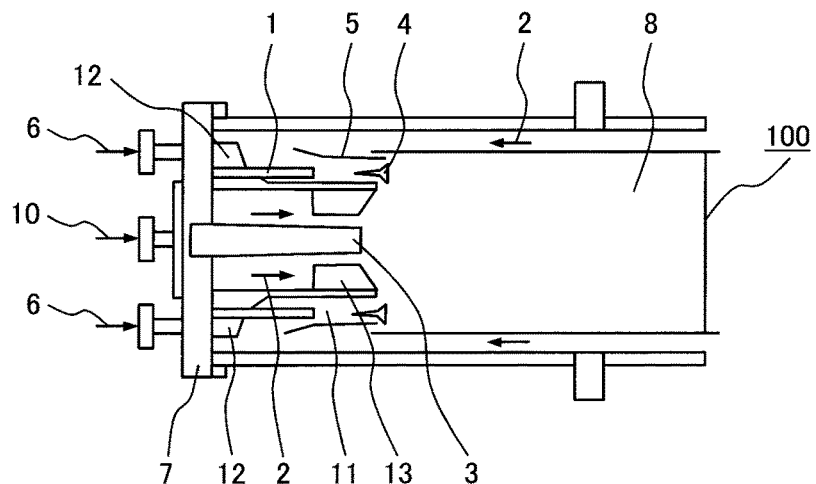
FIG. 1 is a sectional view showing a gas turbine combustor employing a fuel nozzle for gas turbine combustor according to the present invention.

FIG. 1 shows a gas turbine combustor employing a fuel nozzle for gas turbine combustor according to a first embodiment of the present invention.

Referring to FIG. 1, a gas turbine combustor 100 includes a combustion chamber 8, a diffusion fuel nozzle (pilot burner) 3, a premixer 5, and a premixing fuel nozzle 1.

The gas turbine combustor 100 further includes a diffusion combustion burner 13 having the diffusion fuel nozzle 3 for spraying a diffusion combustion fuel 10 into the combustion chamber 8 and includes a premixing combustion burner 11 having the premixing fuel nozzle 1 for spraying a premixing fuel 6 into the premixer 5. Specifically, the diffusion combustion burner 13 is disposed at an upstream central part of the combustion chamber 8 and surrounded by plural premixers 5 and premixing fuel nozzles 1 for premixed combustion. The diffusion combustion burner 13 and the premixing combustion burner 11 are mechanically joined to an end flange 7.

Figure 2:
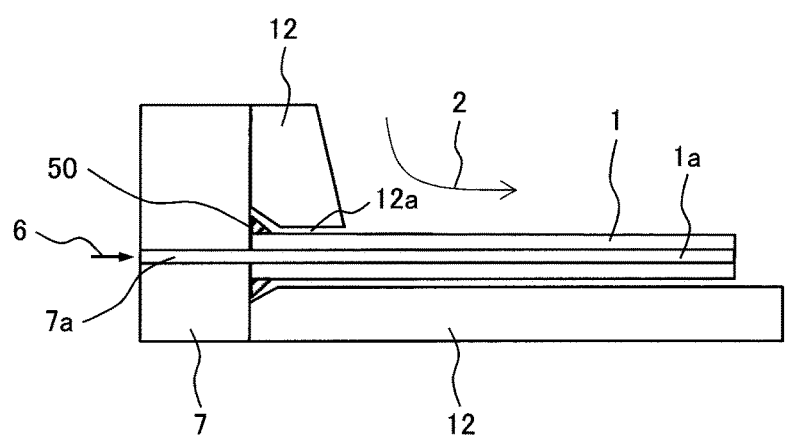
FIG. 2 is a fragmentary sectional view showing a premixer provided with a premixing fuel nozzle shown in FIG. 1.
Figure 9:
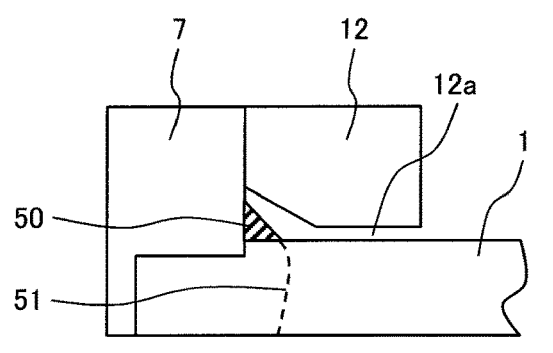
FIG. 9 is a fragmentary sectional view showing a premixer provided with a premixing fuel nozzle according to a conventional fuel nozzle for gas turbine combustor.

FIG. 2 shows the premixer 5 provided with the premixing fuel nozzle 1 shown in FIG. 1. FIG. 9 shows a premixer 5 provided with a conventional premixing fuel nozzle 1.

As shown in FIG. 2 and FIG. 9, the premixer 5 includes a gas flow path where a combustion air 2 flows and the premixing fuel nozzle 1 disposed in the gas flow path. The premixing fuel 6 sprayed from the premixing fuel nozzle 1 is mixed with the combustion air 2 in the premixer 5 before supplied to the combustion chamber 8.

As shown in FIG. 2, the premixing fuel 6 flows through a hole 7a formed in the end flange 7 and an internal hole la of the premixing fuel nozzle 1 to be sprayed into the premixer 5. The premixing fuel nozzle 1 has its root portion joined to the end flange 7 with a fillet weld 50. The fuel nozzle in FIG. 9 is similarly welded, too.

As described above, the premixing fuel nozzle 1 is arranged around the diffusion combustion burner 13 located at the center of the combustion chamber 8. A diffusion combustion burner support 12 for fixing the diffusion combustion burner 13 to the end flange 7 has a hole 12a to avoid interference between the premixing fuel nozzle 1 and the diffusion combustion burner support 12.

These components are assembled together according to a procedure including the steps of welding the premixing fuel nozzle 1 to the end flange 7, and mounting the diffusion combustion burner support 12 with the hole 12a around the premixing fuel nozzle 1 from the distal end portions of the premixing fuel nozzle.

The combustion oscillation may occur when the combustion air 2 and the diffusion combustion fuel 10 fed into the combustion chamber 8 are combusted. The premixing combustion burner 11 is more susceptible to combustion oscillation than the diffusion combustion burner. What is more, the premixing combustion burner 11 tends to apply a great oscillation stress to the premixing fuel nozzle 1 because the premixing combustion burner encounters large pressure fluctuations in the event of combustion oscillation. The oscillation stress takes a form where the oscillating distal end portion of the premixing fuel nozzle 1 repeatedly applies bending stress to the root portion as a junction between the premixing fuel nozzle 1 and the end flange 7 and to a welded part 50.

According to the conventional art shown in FIG. 9, significant oscillation stresses repeatedly applied to the premixing fuel nozzle 1 may induce cracks 51 at a weld toe, for example. The cracks 51 may run into the nozzle 1 to penetrate the cross section of the nozzle, resulting in the fracture of the entirety of the premixing fuel nozzle 1.

In the event of a fracture at the root portion or weld toe of the premixing fuel nozzle 1 of the conventional art, broken pieces of the premixing fuel nozzle 1 may scatter toward the combustion chamber 8 through the hole 12a of the diffusion fuel burner support 12, damaging some combustor components on the downstream side.

A nozzle for the gas turbine combustor according to the embodiment of the present invention for preventing such an event is described below.

FIG. 1 shows the nozzle for the gas turbine combustor according to a first embodiment of the present invention. In each of the embodiments described hereinlater, it is assumed that an outside diameter part of the premixing fuel nozzle 1 is divided into three portions: a root portion 21 which is the thickest; a step portion 20 linear and thinner than the root portion 21; and a distal end portion 22 linear and as thick as the step portion 20.

Figure 3:
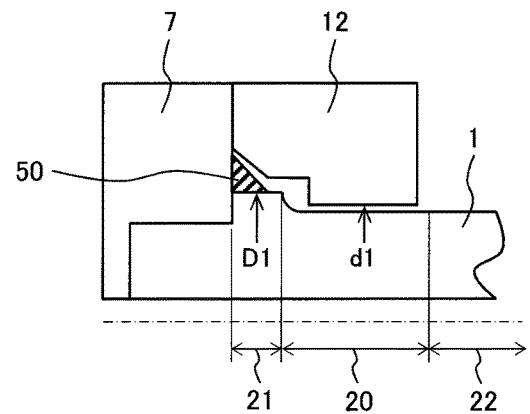
FIG. 3 is a fragmentary sectional view showing a fuel nozzle for gas turbine combustor according to a first embodiment of the present invention.

The fuel nozzle for gas turbine combustor according to a first embodiment shown in FIG. 3 includes the step portion 20 at the root portion 21 in the vicinity of the junction between the premixing fuel nozzle 1 and the end flange 7. The root portion 21 of the premixing fuel nozzle 1 has an outside diameter D1 greater than an inside diameter d1 of the diffusion combustion burner support 12. This configuration eliminates the following problem.

If the cracks 51 occur at the weld toe of the welded part 50 prone to be lower in oscillation strength than other areas and result in breakage of the welded part 50 of the premixing fuel nozzle 1, the fuel leaks from the broken area. However, broken pieces of the premixing fuel nozzle 1 do not scatter to the downstream side through the hole 12a of the diffusion combustion burner support 12. Thus, the problem of damaging any combustor component on the downstream side is eliminated. Further, bending stress is reduced by making the outside diameter D1 of the root portion 21 of the premixing fuel nozzle 1 greater than that of the conventional art. Hence, the oscillation strength of the welded part 50 can be increased as well.

Further in this embodiment, a boundary region between the step portion 20 and the root portion 21 has an arc-like profile changing smoothly so that the stress concentration factor of this region is decreased. This lessens a fear of the occurrence of cracks at this region and the breakage of the premixing fuel nozzle 1.

Such a configuration in this embodiment achieves the following effects. The premixing fuel nozzle 1 increases the oscillation strength because the root portion 21 of the premixing fuel nozzle 1 has the outside diameter D1 greater than that of the conventional art. Since the outside diameter D1 of the root portion 21 of the premixing fuel nozzle 1 is greater than the inside diameter d1 of the diffusion combustion burner support 12, there is no fear about the scattering of the broken pieces of the premixing fuel nozzle 1 in the downstream direction even though the premixing fuel nozzle 1 is broken at the welded part 50 with the end flange 7, eliminating the fear of damaging any combustor component.

Second Embodiment

Figure 4:
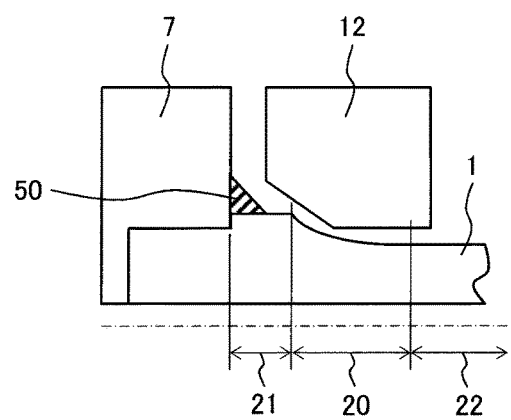
FIG. 4 is a fragmentary sectional view showing a fuel nozzle for gas turbine combustor according to a second embodiment of the present invention.

FIG. 4 shows a nozzle for the gas turbine combustor according to a second embodiment of the present invention.

According to the fuel nozzle for gas turbine combustor according to the second embodiment shown in FIG. 4, the outside diameter of the premixing fuel nozzle 1 is varied at the step portion 20 thereof in a manner to define an arc-like profile over the entire longitudinal length of the step portion 20. Specifically, the step portion 20 of the premixing fuel nozzle 1 is configured in a fillet shape. The stress concentration factor of the profile change portion is further reduced by configuring the step portion 20 in the fillet shape. Thus, the stress on the root portion 21 of the premixing fuel nozzle 1 is reduced.

Since the outside diameter of the root portion 21 of the premixing fuel nozzle 1 is greater than the inside diameter of the diffusion combustion burner support 12, the application of such a configuration to the step portion 20 does not cause a problem that the broken pieces of the premixing fuel nozzle 1 scatter in the downstream direction even though the premixing fuel nozzle 1 breaks off from the welded part 50.

Third Embodiment

Figure 5:
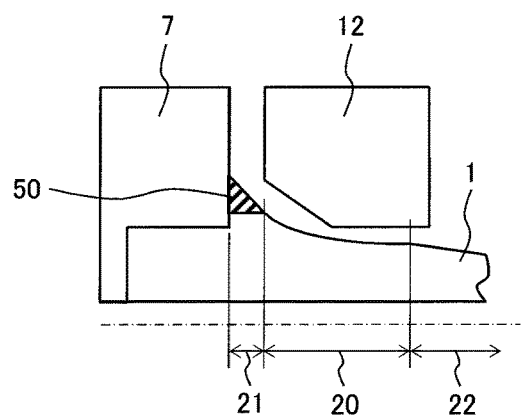
FIG. 5 is a fragmentary sectional view showing a fuel nozzle for gas turbine combustor according to a third embodiment of the present invention.

FIG. 5 shows a nozzle for the gas turbine combustor according to a third embodiment of the present invention.

In the fuel nozzle for gas turbine combustor according to the third embodiment shown in FIG. 5, the outside diameter of the premixing fuel nozzle 1 varies at the step portion 20 thereof in a manner to define an arc-like profile (fillet shape) extended from the weld toe of the welded part 50 to the end of the step portion 20. In addition, the distal end portion 22 of the premixing fuel nozzle 1 is tapered to form a taper portion whereby the outside diameter of the premixing fuel nozzle 1 continuously varies in the longitudinal direction from the distal end portion 22 to the root portion 21 thereof. Namely, the outside diameter of the premixing fuel nozzle 1 varies to define a linear profile part at the root portion 21, a fillet-like profile part at the step portion 20, and a tapered profile part at the distal end portion 22.

The following effects as well as the same effects as in the first and second embodiments can be obtained by making such a configuration. The distal end portion 22 of the premixing fuel nozzle 1 is reduced not only in weight but also in interference with the combustion air 2 supplied for the premixed combustion. Therefore, the premixing fuel nozzle 1 configured to have the increased outside diameter can increase oscillation strength without degrading the premixed combustion performance.

The increase in the diameter of the premixing fuel nozzle 1 at its portion which is distal from the diffusion combustion burner support 12 and is in contact with the combustion air 2 leads to a fear that the premixing fuel nozzle 1 may adversely affect combustion performance such as degrading mixing performance of the combustion air 2 and the fuel 10. However, the combustion performance is not adversely affected by the increase in the outside diameter of the premixing fuel nozzle 1 at its portion closer to the root thereof from the diffusion combustion burner support 12.

Fourth Embodiment

Figure 6:
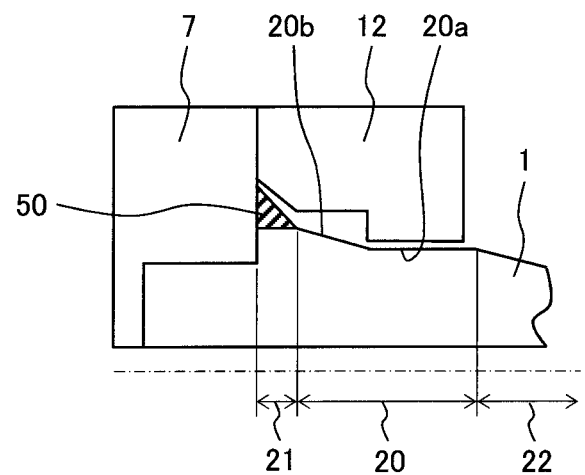
FIG. 6 is a fragmentary sectional view showing a fuel nozzle for gas turbine combustor according to a fourth embodiment of the present invention.

FIG. 6 shows a nozzle for the gas turbine combustor according to a fourth embodiment of the present invention.

In the fuel nozzle for gas turbine combustor according to the fourth embodiment shown in FIG. 6, the fillet shape of the step portion 20 in the third embodiment is configured to include a parallel portion (linear portion) 20a and a tapered portion 20b.

This configuration can achieve the same effects as those in the third embodiment.

Fifth Embodiment

Figure 7:
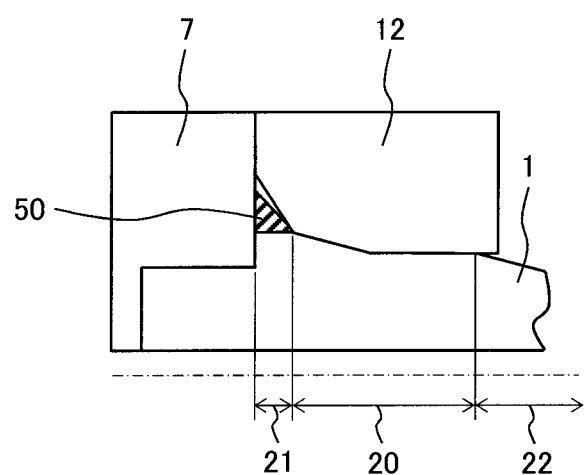
FIG. 7 is a fragmentary sectional view showing a fuel nozzle for gas turbine combustor according to a fifth embodiment of the present invention.

FIG. 7 shows a nozzle for the gas turbine combustor according to a fifth embodiment of the present invention.

In the fuel nozzle for gas turbine combustor according to the fifth embodiment shown in FIG. 7, the diffusion combustion burner support 12 includes a hole configured to comply with the configuration of the step portion 20 in the fourth embodiment so that the premixing fuel nozzle 1 and the diffusion combustion burner support 12 are pressured and brought into contact with each other when the diffusion combustion burner support 12 is fixed to the end flange 7 by tightening bolts.

The following effects as well as the same effects as in the foregoing embodiments can be obtained by adopting such a configuration. When the premixing fuel nozzle 1 oscillates in combustion oscillation or the like, friction occurs at a contact interface between the premixing fuel nozzle 1 and the diffusion combustion burner support 12, effectively damping the oscillation.

Such an effect to damp the oscillation by bringing the premixing fuel nozzle 1 and the diffusion combustion burner support 12 into tight contact is obtained if the both components are configured to be in tight contact with each other, not only in the configuration in the fifth embodiment shown in FIG. 7.

EXPERIMENTAL EXAMPLE 1

The present inventors have evaluated the oscillation strengths of the premixing fuel nozzle 1 according to an embodiment of the present invention. The effects of this embodiment are compared with those of the conventional art. The comparison results are described as below.

The premixing fuel nozzle 1 of the conventional art shown in FIG. 9 and the premixing fuel nozzle 1 according to the first embodiment of the present invention shown in FIG. 3 are used as fatigue strength samples of this experimental example. The fatigue limit of each sample is estimated by performing a fatigue test where a displacement is imparted to a distal end portion of each of the premixing fuel nozzles 1. The material of the premixing fuel nozzle 1 and the end flange 7 is SUS304. The root portion 21 of the premixing fuel nozzle 1 is fillet welded to the end flange 7.

Two types of samples of the first embodiment of the present invention are prepared which have an angular curvature of R0.5 and R2.0 at the boundary region between the step portion 20 and the root portion 21 of the premixing fuel nozzle 1. The samples are different in the stress concentration factor at the region concerned. The test is performed at a temperature of 400° C. in the atmosphere.

Table 1 shows the comparison of bending fatigue strength of the premixing fuel nozzle 1 between in the first embodiment of the present invention and in the conventional art. Table 1 shows test results where nominal bending stress acting on the welded part 50 of the premixing fuel nozzle 1 is used for the fatigue strength of the premixing fuel nozzle 1.

TABLE 1

| NOZZLE CONFIGURATION | OUTSIDE DIAMETER OF NOZZLE | | | ANGULAR CURVATURE OF ROOT/STEP | STRESS CONCENTRATION FACTOR OF ROOT/STEP | FATIGUE LIMIT (MPa) | FRACTURE LOCATION |
|---|---|---|---|---|---|---|---|
| | ROOT PORTION (mm) | STEP PORTION (mm) | DISTAL END PORTION (mm) | | | | |
| FIRST EMBODIMENT | φ14 | φ10 | φ10 | R0.5 | 3 | 65 | STEP PORTION |
| FIRST EMBODIMENT | φ14 | φ10 | φ10 | R2 | 1.4 | 85 | WELDED PORTION |
| CONVENTIONAL ART | φ14 | φ14 | φ14 | — | — | 85 | WELDED PORTION |
| | φ10 | φ10 | φ10 | — | — | 85 | WELDED PORTION |

According to Table 1, the premixing fuel nozzles of the conventional art have fatigue strength of about 85 MPa. Both of the premixing fuel nozzles 1 having the outside diameters of φ10 and φ14 have substantially the same results.

On the other hand, the results of the first embodiment of the present invention are as follows. The premixing fuel nozzle 1 of the first embodiment having a smooth angular curvature R2 at the step portion 20 produces substantially the same result as of the conventional art. However, the premixing fuel nozzle 1 of the first embodiment having an acute angular curvature R0.5 exhibits slightly lower fatigue strength of 65 MPa. This is because the fuel nozzle having an acute angular curvature and a great stress concentration breaks at the corner rather than the welded part 50.

SUS304 used for this premixing fuel nozzle 1 has a fatigue limit of about 200 MPa. If the step portion 20 subjected to a stress greater than 85 MPa equivalent to the fatigue limit of the welded part 50 is included in the premixing fuel nozzle 1, the fatigue strength of the step portion 20 becomes lower than that of the welded part 50. That is, in a case where the root portion 21 of the premixing fuel nozzle 1 is formed with the step portion 20, the step portion 20 needs to have a stress concentration factor less than 2.35 which is a ratio of fatigue strength between the welded part 50 and the base material.

In the foregoing embodiments, if the external configuration of the premixing fuel nozzle 1 varies and contains a non-contiguous area, it is desirable to define the stress concentration factor of the non-contiguous area to be 2.35 or less.

Figure 8:
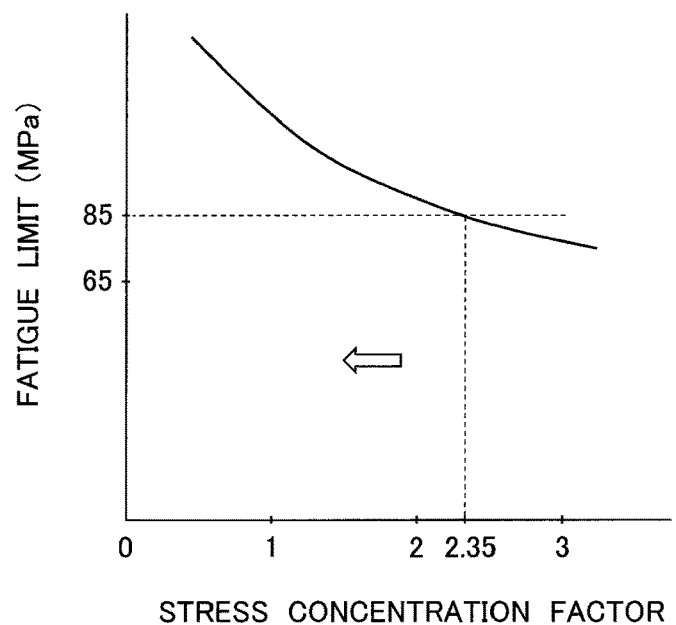
FIG. 8 is a characteristic graph showing the results of experiments made by the present inventors, representing a relation between the stress concentration factor of a step portion formed at a root portion of the premixing fuel nozzle and the fatigue limit of a welded part.

FIG. 8 is a graph showing a relation between the stress concentration factor of the step portion 20 and the fatigue limit of the welded part 50 in the case where the root portion 21 of the premixing furl nozzle 1 is formed with the step portion 20. As shown in the graph of FIG. 8, it is apparent that even though the fatigue limit is decreased from about 200 MPa equivalent to the fatigue limit of SUS304, the fatigue strength can be maintained at high levels as long as the stress concentration factor is 2.35 or less at an intersection of the graph with 85 MPa equivalent to the fatigue limit of the welded part 50. It is understood that the stress concentration factor of 2.35 or less is preferred.

It is to be understood that the present invention is not limited to the foregoing embodiments but may include a variety of exemplary modifications. For instance, the foregoing embodiments are detailed description of the present invention for clarity, and the present invention is not necessarily limited to those including all the components described. A part of the structure of one embodiment can be replaced with a structure of another embodiment. Further, a structure of one embodiment can be added with a structure of another embodiment. Further, a part of the structure of each embodiment permits addition of or replacement with another structure, or permits cancellation thereof.

EXPLANATION OF REFERENCE CHARACTERS

1 . . . PREMIXING FUEL NOZZLE
1a . . . INTERNAL HOLE OF PREMIXING FUEL NOZZLE
2 . . . COMBUSTION AIR
3 . . . DIFFUSION FUEL NOZZLE
4 . . . FLAME STABILIZER
5 . . . PREMIXER
6 . . . PREMIXING FUEL
7 . . . END FLANGE
7a . . . HOLE OF END FLANGE
8 . . . COMBUSTION CHAMBER
10 . . . DIFFUSION COMBUSTION FUEL
11 . . . PREMIXING COMBUSTION BURNER
12 . . . DIFFUSION COMBUSTION BURNER SUPPORT
12a . . . HOLE OF DIFFUSION COMBUSTION BURNER SUPPORT
13 . . . DIFFUSION COMBUSTION BURNER
20 . . . STEP PORTION OF PREMIXING FUEL NOZZLE
20a . . . PARALLEL PORTION (LINEAR PORTION) OF STEP PORTION
20b . . . TAPERED PORTION OF STEP PORTION
21 . . . ROOT PORTION OF PREMIXING FUEL NOZZLE
22 . . . DISTAL END PORTION OF PREMIXING FUEL NOZZLE
50 . . . WELDED PART
51 . . . CRACKS
100 . . . GAS TURBINE COMBUSTOR

What is claimed is:
1. A fuel nozzle for a gas turbine combustor, comprising:
a diffusion combustion burner including a diffusion fuel nozzle for spraying a diffusion combustion fuel into a combustion chamber;
a premixing combustion burner including a premixing fuel nozzle for spraying a premixing fuel into a premixer;
an end flange to which the diffusion combustion burner and the premixing combustion burner are mechanically joined; and
a diffusion combustion burner support which fixes the diffusion combustion burner to the end flange and is mounted around the premixing fuel nozzle in a manner to cover a first portion of the premixing fuel nozzle that includes a junction between the premixing fuel nozzle and the end flange, wherein an outside diameter of the premixing fuel nozzle longitudinally varies in a manner to progressively increase toward the junction, wherein a maximum diameter of the first portion of the premixing fuel nozzle is greater than a smallest inside diameter of a hole formed in the diffusion combustion burner support, and wherein the first portion of the premixing fuel nozzle is fillet welded to the end flange.

2. The fuel nozzle for the gas turbine combustor according to claim 1, wherein an outside diameter part of the premixing fuel nozzle includes the first portion which is the thickest, a step portion thinner than the first portion, and a distal end portion as thick as the step portion or thinner than the step portion.

3. The fuel nozzle for the gas turbine combustor according to claim 2, wherein the first portion and the step portion are located inside the hole formed in the diffusion combustion burner support.

4. The fuel nozzle for the gas turbine combustor according to claim 2, wherein a boundary region between the first portion and the step portion has an arc shape.

5. The fuel nozzle for the gas turbine combustor according to claim 2, wherein the step portion has a fillet shape.

6. The fuel nozzle for the gas turbine combustor according to claim 2, wherein the outside diameter part of the premixing fuel nozzle includes the first portion in a linear shape, the step portion in a fillet shape, and the distal end portion in a tapered shape.

7. The fuel nozzle for the gas turbine combustor according to claim 6, wherein the step portion in the fillet shape includes a linear portion and a tapered portion.

8. The fuel nozzle for the gas turbine combustor according to claim 4, wherein an inside diameter part of the hole formed in the diffusion combustion burner support has a shape conforming to a shape of the outside diameter part of the premixing fuel nozzle, and wherein the hole formed in the diffusion combustion burner support is in tight contact with the premixing fuel nozzle.

9. The fuel nozzle for the gas turbine combustor according to claim 4, wherein the premixing fuel nozzle has a stress concentration factor of 2.35 or less at an area where the outside diameter part of the premixing fuel nozzle longitudinally and discontinuously varies.

* * * * *